(12) United States Patent
Ramirez

(10) Patent No.: US 6,935,070 B2
(45) Date of Patent: Aug. 30, 2005

(54) APPARATUS FOR DISPLAYING CULINARY, HORTICULTURAL OR FLORAL ITEMS

(76) Inventor: Steven W. Ramirez, 6 Lois La., Sharon, MA (US) 02067

( * ) Notice: Subject to any disclaimer, the term of this patent is extended or adjusted under 35 U.S.C. 154(b) by 0 days.

(21) Appl. No.: 10/215,994

(22) Filed: Aug. 9, 2002

(65) Prior Publication Data

US 2004/0025425 A1 Feb. 12, 2004

(51) Int. Cl.[7] ................................................ A01G 5/00
(52) U.S. Cl. ...................................... 47/41.01; 47/41.13
(58) Field of Search ....................... 47/39, 41.01, 41.1, 47/41.11, 41.12, 41.13, 41.14, 41.15

(56) References Cited

U.S. PATENT DOCUMENTS

| | | | | |
|---|---|---|---|---|
| 649,874 A | * | 5/1900 | Payne | 47/41.11 |
| 928,213 A | * | 7/1909 | Patterson | 248/121 |
| 1,423,906 A | * | 7/1922 | Brettschneider | 47/41.11 |
| 1,631,631 A | * | 6/1927 | Gerlinger | 431/126 |
| 1,638,250 A | * | 8/1927 | Finlayson | 47/41.13 |
| 1,762,843 A | * | 6/1930 | Straub | 47/41.11 |
| 1,769,198 A | * | 7/1930 | Albany | 47/55 |
| 1,868,423 A | * | 7/1932 | Roberts | 47/41.11 |
| 1,892,393 A | * | 12/1932 | Halm | 47/41.13 |
| 2,003,101 A | * | 5/1935 | Asman | 47/41.13 |
| D97,712 S | * | 12/1935 | Orben | D11/147 |
| 2,029,643 A | * | 2/1936 | Sinclair | 47/41.13 |
| 2,047,321 A | * | 7/1936 | Hart | 47/41.13 |
| 2,151,192 A | * | 3/1939 | Crosser | 431/295 |
| 2,601,743 A | * | 7/1952 | Karsted | 47/41.13 |
| 2,624,968 A | * | 1/1953 | Polizzi | 47/55 |
| D188,384 S | * | 7/1960 | Messer | D11/147 |
| 3,087,280 A | * | 4/1963 | Seliger | 47/41.13 |
| D214,171 S | | 5/1970 | Troutman | |
| 3,676,275 A | | 7/1972 | Sloane | |
| 3,829,349 A | | 8/1974 | Hermanson | |
| 3,857,747 A | | 12/1974 | Bitecola | |
| 3,928,712 A | | 12/1975 | Sears | |
| D248,842 S | | 8/1978 | Ditto | |
| 4,171,754 A | * | 10/1979 | Rosado | 222/646 |
| 4,173,843 A | | 11/1979 | Marble | |
| 4,340,625 A | | 7/1982 | Willinger | |
| 4,534,129 A | * | 8/1985 | Stuckey | 47/47 |

(Continued)

FOREIGN PATENT DOCUMENTS

| | | | |
|---|---|---|---|
| DE | 3803589 | * | 8/1989 |
| EP | 0824885 A2 | | 2/1998 |
| EP | 0824885 A3 | | 12/1999 |
| EP | 1077047 A2 | | 2/2001 |
| EP | 1077047 A3 | | 10/2001 |
| FR | 1271112 A | | 9/1961 |
| FR | 2614194 | * | 10/1988 |
| GB | 990705 A | | 4/1965 |
| JP | 6-297900 | * | 10/1994 |
| JP | 9-407 | * | 1/1997 |
| JP | 10-5091 | * | 1/1998 |
| JP | 10-64722 | * | 3/1998 |

OTHER PUBLICATIONS http://www.dickblick.com, Dick Blick Art Materials, Wire Art Sculpture Kit, printed May 7, 2002, 2 pages.

(Continued)

Primary Examiner—Peter M. Poon
Assistant Examiner—David J Parsley
(74) Attorney, Agent, or Firm—Wolf, Greenfield & Sacks P.C.

(57) ABSTRACT

An apparatus for displaying at least one of culinary, horticultural and floral item(s) allows the item to be easily attached to or removed from a variety of bases. The display may include a support for holding the arrangement. The support may be made of reformable sculpting wire, allowing a user to form the wire in any desired shape. The interface may comprise an insulating material, allowing the arrangement to be mounted to an ice sculpture. The base may be any decorative base.

19 Claims, 7 Drawing Sheets

U.S. PATENT DOCUMENTS

| | | | |
|---|---|---|---|
| 4,600,612 A | | 7/1986 | Litwin et al. |
| 4,606,950 A | | 8/1986 | Corbet |
| D287,345 S | | 12/1986 | McLaughlin |
| D288,304 S | | 2/1987 | Grun |
| D291,072 S | | 7/1987 | Hebert, Jr. |
| 4,678,150 A | * | 7/1987 | Newman et al. ......... 248/205.3 |
| 4,950,509 A | | 8/1990 | DeMott |
| 5,063,485 A | * | 11/1991 | Harris ........................ 362/122 |
| 5,082,699 A | | 1/1992 | Landau |
| 5,120,583 A | | 6/1992 | Garcia |
| 5,127,184 A | * | 7/1992 | Cosentino .................. 47/41.01 |
| D344,043 S | | 2/1994 | Brookshire, Sr. |
| D361,291 S | | 8/1995 | Chavalas |
| 5,508,070 A | * | 4/1996 | DiLapo et al. ................ 428/24 |
| 5,570,863 A | | 11/1996 | Cooper |
| 5,677,018 A | | 10/1997 | Shin |
| 5,682,648 A | * | 11/1997 | Miller ............................. 24/5 |
| 5,698,275 A | * | 12/1997 | Pompeo ....................... 428/24 |
| D390,157 S | | 2/1998 | Burnett |
| 5,759,645 A | | 6/1998 | Li |
| 5,805,075 A | | 9/1998 | Carlson et al. |
| D401,886 S | | 12/1998 | Burnett |
| 5,935,054 A | * | 8/1999 | Loos ............................. 600/9 |
| 5,962,088 A | | 10/1999 | Tanaka et al. |
| 6,004,635 A | | 12/1999 | Li |
| 6,027,083 A | * | 2/2000 | Chang ........................ 248/153 |
| 6,038,812 A | | 3/2000 | Belokin et al. |
| 6,082,045 A | | 7/2000 | Weder et al. |
| 6,093,458 A | | 7/2000 | Worchester |
| 6,093,459 A | | 7/2000 | Pulio, Jr. |
| D441,688 S | | 5/2001 | Clarke |
| 6,306,471 B1 | | 10/2001 | Pitman et al. |
| D453,910 S | | 2/2002 | Jones, II |
| 6,349,501 B1 | * | 2/2002 | Freeman .................... 47/41.01 |
| 6,401,726 B1 | * | 6/2002 | Sonstegard ................. 132/275 |

OTHER PUBLICATIONS http://www.dickblick.com, Dick Blick Art Materials, Wire Art Mini–Kids Kit, printed May 7, 2002, 2 pages.

http://www.dickblick.com, Dick Blick Art Materials, Wire Art Project Kits, printed May 7, 2002, 2 pages.

http://www.hgtv.com, HGTV crafts & collectibles, Classic Wall Sconces, printed May 7, 2002, 2 pages.

http://www.sculptshop.com, Sculpture House Casting, 10" Animal Armature, printed May 7, 2002, 1 page.

http://www.sculptshop.com, Sculpture House Casting, 24" Heavy Duty Figure Armature, printed May 7, 2002, 1 page.

http://www.sculptshop.com, Sculpture House Casting, 20" Head Armature, printed May 7, 2002, 1 page.

http://www.dickblick.com, Dick Blick Art Materials, Wire Bending Jig, printed May 7, 2002, 2 pages.

http://www.dickblick.com Dick Blick Art Materials, Wire Art for Kids, printed May 7, 2002, 2 pages.

http://www.dickblick.com Dick Blick Art Materials, Sculpture House Wire Armatures with Bases, printed May 7, 2002, 2 pages.

http://www.sculptshop.com, Sculpture House Casting, Armatures, printed May 7, 2002, 2 pages.

http://www.sculptshop.com Sculpture House Casting, 18" Figure Armature, printed May 7, 2002, 1 page.

http://www.hgtv.com, HGTV Food & Lifestyle, Contemporary Wall Vase, printed May 7, 2002, 2 pages.

Ameteur Competitions & Exhibitions Schedule & Information Book, New England Spring Flower Show, Shades of Spring ,Mar. 16–24, 2002.

Enclosed Photo from New England Spring Flower Show 2001.

Judges' Comment Sheet and Ribbon, New England Spring Flower Show, Mar. 16, 2001.

Judges' Comment Sheet and Ribbon, New England Spring Flower Show, Mar. 15, 2002.

Translation of JP 9–407A to Shinozaki, published Jan. 7, 1997.

* cited by examiner

APPARATUS FOR DISPLAYING CULINARY, HORTICULTURAL OR FLORAL ITEMS

BACKGROUND OF THE INVENTION

1. Field of the Invention

The present invention relates to a display apparatus and, more particularly, to a display apparatus for displaying at least one of culinary, horticultural and floral arrangements.

2. Related Art

Current displaying techniques lack a means of easily and aesthetically attaching floral, horticultural or culinary arrangements to a desired base, such as a serving platter, tray, bowl, or even a table in a manner that allows the arrangement to be reused with a different base. In addition, it is difficult to elevate arrangements off the base, especially arrangements that have significant size or weight. Other limitations arise, such as the inability to display arrangements on sculpted ice, without causing significant melting of the ice.

SUMMARY OF THE INVENTION

The display apparatus is for displaying at least one of culinary, horticultural and floral arrangements such that the arrangement can be easily attached to and removed from a variety of bases. The display apparatus may include a support, such as reformable wire, for holding the arrangement and engaging a base. The support may attach to the base through an interface. The base can be any desired base and may depend upon the size, weight and shape of the arrangement.

In one embodiment, a decorative display apparatus for displaying at least one of culinary, horticultural and floral items is disclosed. The apparatus includes a base having magnetic properties, a support from engaging the at least one of culinary horticultural and floral items and an interface magnetically attracted to the base and attached to the support. The interface connects the support to the base.

In another embodiment, a decorative display apparatus for displaying at least one of culinary, horticultural and floral items on an ice sculpture is provided. The apparatus includes an interface adapted to attach to the ice sculpture. The interface includes an insulating material. A support is attached to the interface. The support includes an elongate sculpting wire having a first end, a second end and a length therebetween. The wire is adapted to be formed and reformed by a user into any desired shape. The wire is also adapted to support the at least on of culinary, horticultural and floral items in different orientations with respect to the wire.

In another embodiment, a system for displaying at least one of culinary, horticultural and floral items is disclosed. The system includes a support for supporting the at least one of culinary, horticultural and floral items and an interface attached to the support, with the interface having magnetic properties. The system also includes a plurality of rigid decorative bases. Each decorative base has magnetic properties to allow magnetic coupling of the interface to any one of the plurality of decorative bases. In this manner, a user may selectively couple the interface to a desired decorative base.

In yet another embodiment, a decorative display apparatus for displaying at least one of culinary, horticultural and floral items is disclosed. The apparatus includes a base and a support attached to the base. The support includes an elongated sculpting wire having a first end, a second end and a length therebetween. The wire is adapted to be formed and reformed by a user into any desired shape. The wire is also adapted to support the at least one of culinary, horticultural and floral items in any desired orientation and at any position on the wire.

In still another embodiment, an apparatus for displaying at least one of culinary, horticultural and floral items is disclosed. The apparatus includes a base and a reformable wire-like support attached to the base for engaging one or more of the items. The support is capable of displaying the item or items in a variety of different positions with respect to the base.

Various embodiments of the present invention provide certain advantages and overcome certain limitations of prior culinary, horticultural or floral display apparatuses. Embodiments of the invention may not share the same advantages, and those that do may not share them under all circumstances. Further, any number of combinations of elements may be employed, as the present invention is not limited in this respect.

BRIEF DESCRIPTION OF THE DRAWINGS

Various embodiments of the invention will now be described, by way of example, with reference to the accompanying drawings, in which.

DETAILED DESCRIPTION

The display apparatus of the present invention enables culinary, horticultural and/or floral arrangement to be easily attached to and removed from a variety of bases. The display apparatus includes a support for holding the arrangement. The device may include an interface, having magnetic capabilities, enabling the support to be attached to any base having magnetic capabilities. The base may be any decorative base. The interface may comprise an insulating material, allowing the arrangement to be mounted to an ice sculpture. The support may be made of reformable sculpting wire, allowing a user to form the wire in any desired shape. The foregoing features of the display apparatus may be employed alone or in any suitable combination.

Figure 1:
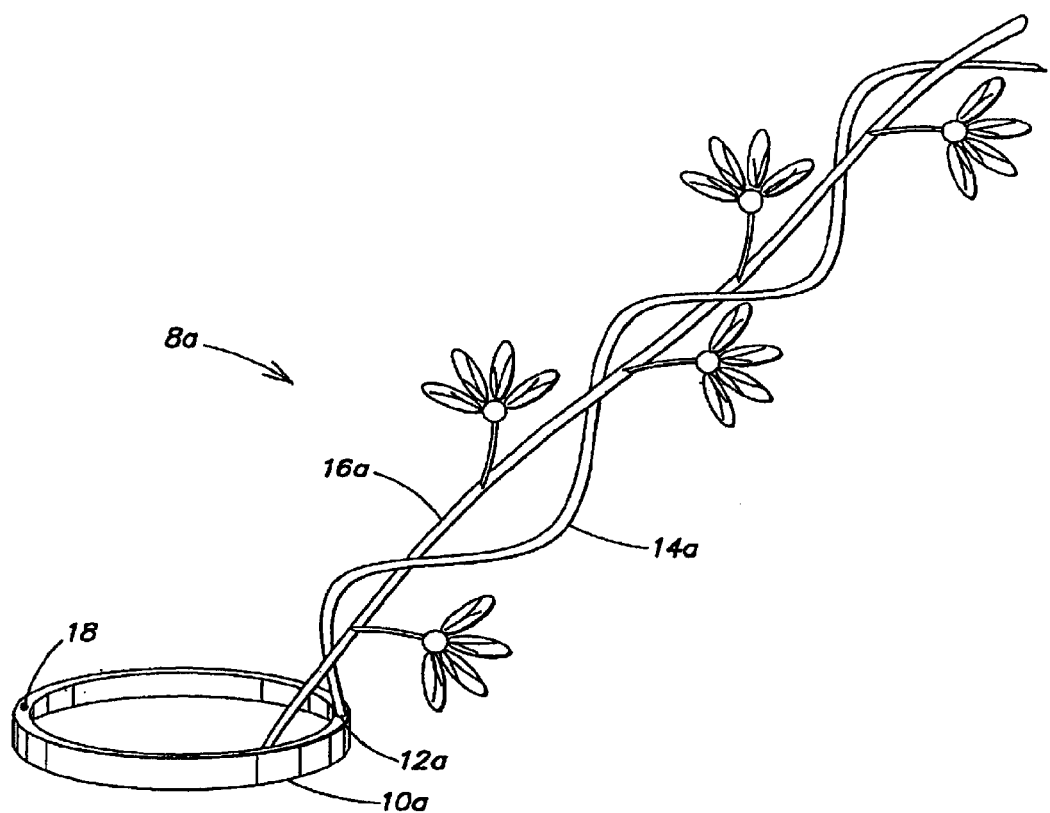
FIGS. 1–6 are perspective views of different embodiments of the invention.

In one embodiment, depicted in FIG. 1, a displaying apparatus (8a), for a floral item is shown. The device (8a) includes a base (10a), formed as a bottle holder such as a wine coaster, an interface (12a), formed as a socket, and a support (14a), formed as a reformable wire. The wire (14a) supports the floral item by wrapping around it, as shown. Other suitable arrangements or configurations for supporting the item may be employed, as the present invention is not limited in this respect. In this respect, although the wire is shown as being wrapped around the item, the wire may be shaped or configured by a user to engage the item in any desired manner.

Figure 2:
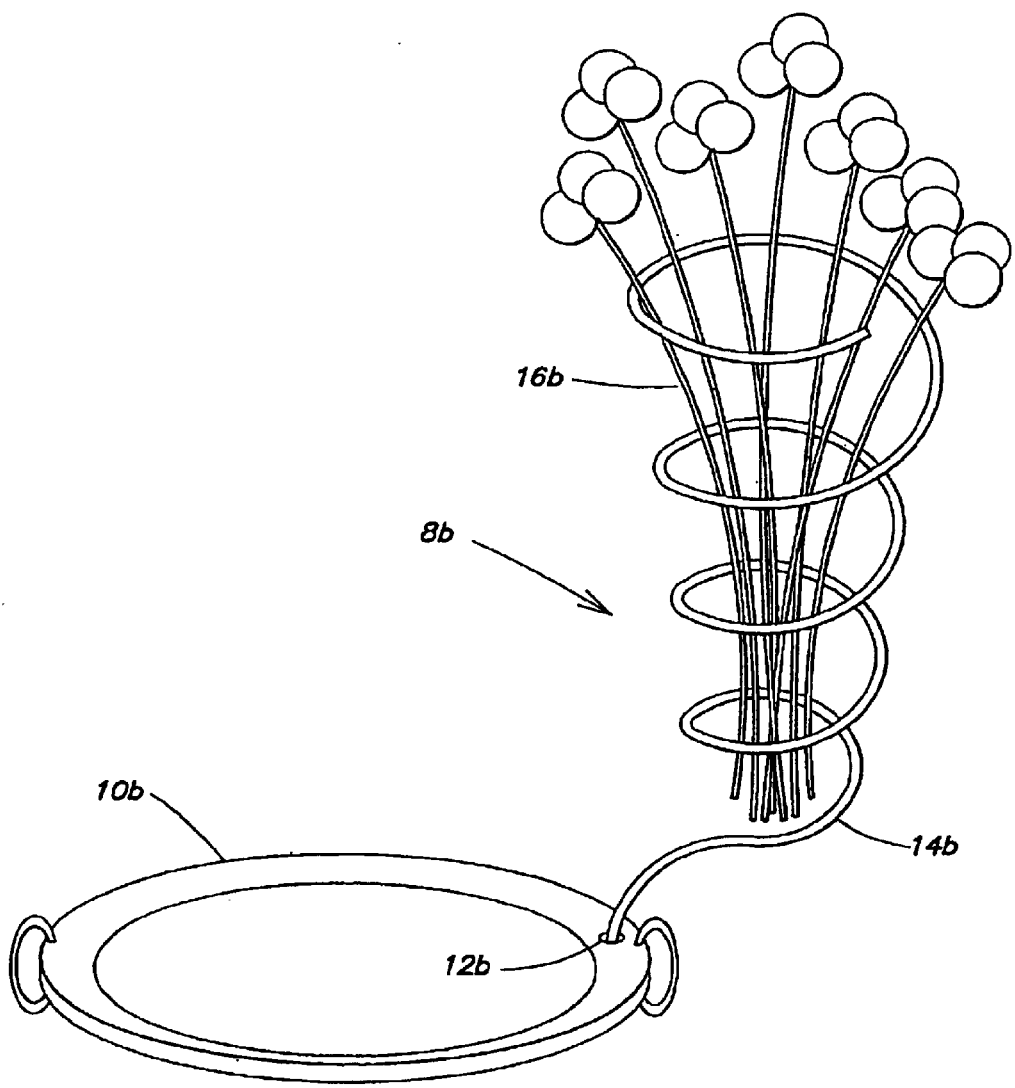

It should be appreciated that, as in FIG. 2, the support may support a plurality of items (16b). The support (14a) may be removably inserted into the interface (12a) in the base (10a). The socket (12a), while depicted on the upper surface (18) of the bottle holder (10a), may be on any surface of the base (10a).

It should be appreciated that the base (10a) may be made from any material, such as wood, metal (e.g., aluminum), an insulating material (e.g., wood), ceramic, glass, ice or any other medium. It should be further appreciated that the base (10a) need not be a bottle holder and may be any object that can accommodate the interface (12a) for the support (14a), as described in greater detail below. The base may be a vase, a wine coaster (as in FIG. 1), a serving platter, a tray, a stand, a pedestal, a table top, a plug or any other object. As seen in FIG. 2, the base comprises a serving platter (10b).

Figure 6:
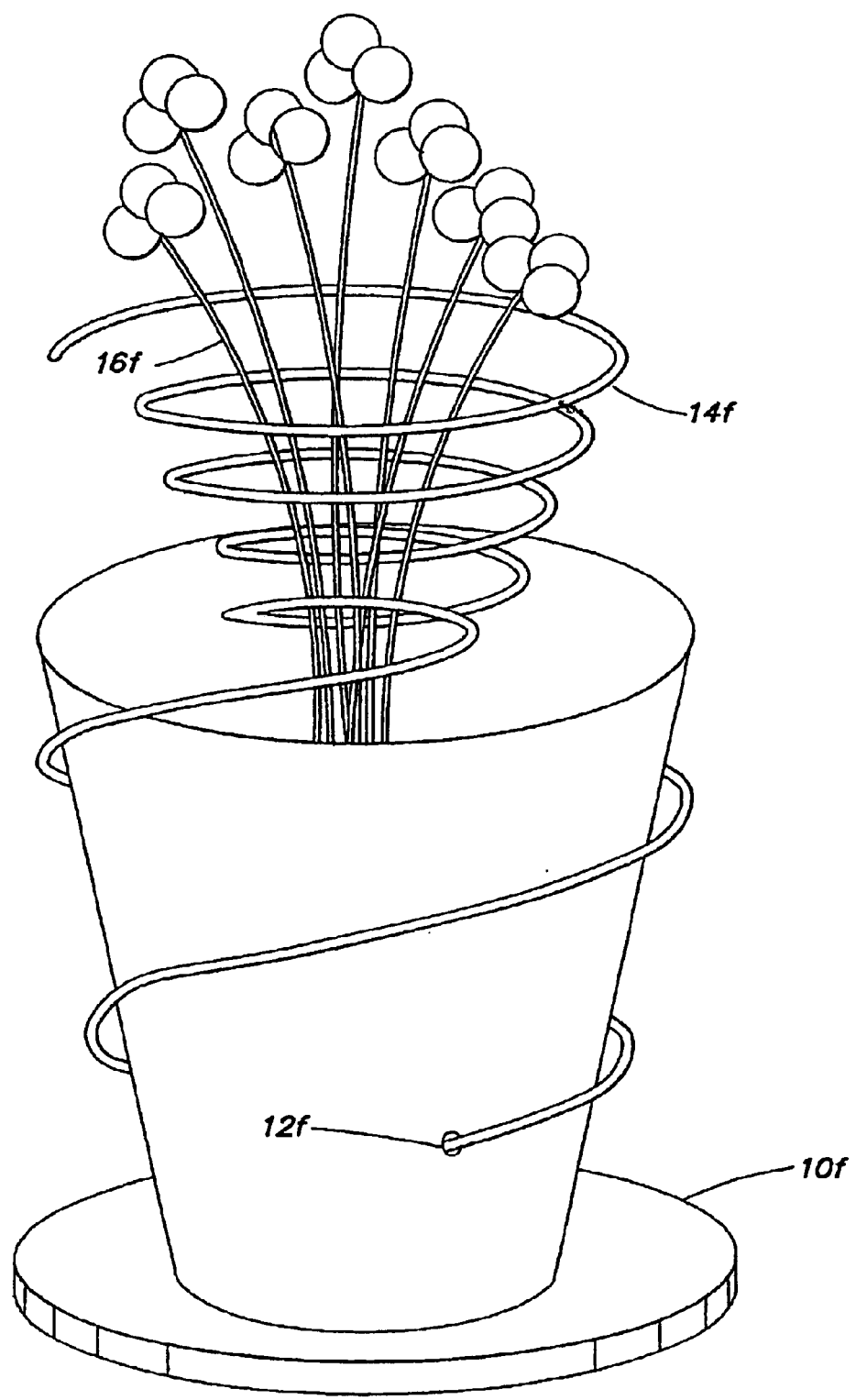

The interface in FIGS. 1, 2 and 6 is a socket (12a, b and f, respectively) in the base into which the support may be inserted. Preferably, the support should snuggly fit into the interface, such that the support will be securely held. Although in the embodiment described with reference to FIGS. 1, 2 and 6, the interface comprises a socket, the invention is not limited in this respect, as other suitable interfaces may be employed. For example, the interface may be a magnet, a clip, an adhesive, a clamp, or any other means of attachment that would enable a support to be attached to a base.

In one embodiment, the support (14a) may be a sculpting and/or reformable wire, such as an aluminum armature wire. The use of wire enables the floral, horticultural or culinary item to be elevated or otherwise offset from the base. The use of reformable wire also allows the support to be shaped in any fashion. The wire may be made from any material such as metal (e.g., aluminum or copper) and may have any length and diameter. A portion of the wire may be unadorned, painted, anodized, twisted, or aesthetically decorated in any way. For example, as shown in the embodiment depicted in FIG. 3, an unadorned portion (13) may be located between the base and the floral, horticultural or culinary item.

As mentioned, the wire may be reformable by a user, allowing it to be used and re-used, and shaped into any desired shape. The reformability of the wire also enables the wire to support many differently sized or shaped item(s), both mechanically and aesthetically. The wire may take any shape and may be curled, wrapped, circled, angled, linear or any other configuration. In addition or in the alternative, the wire may be formed so that it can support a second base that in turn may support the item(s).

Figure 3:
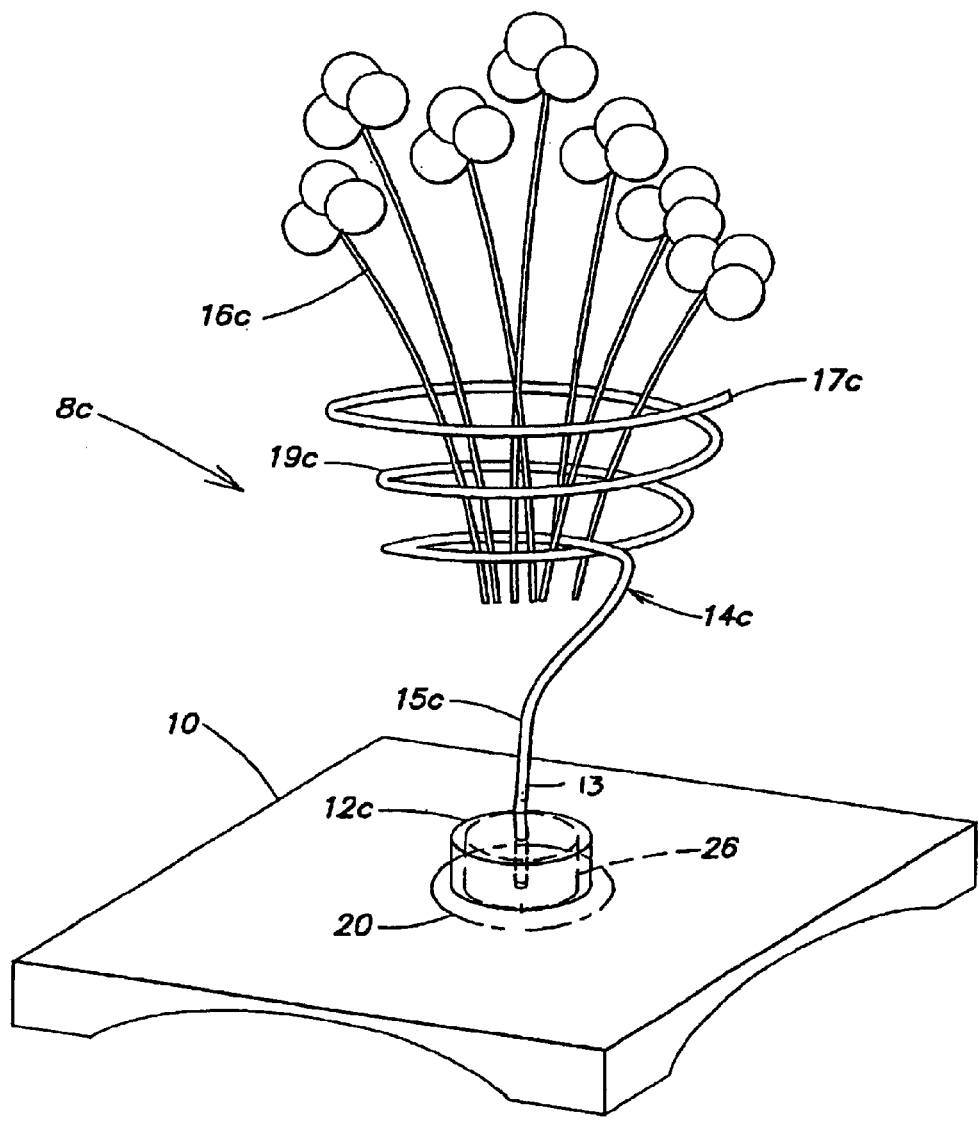
Figure 4:
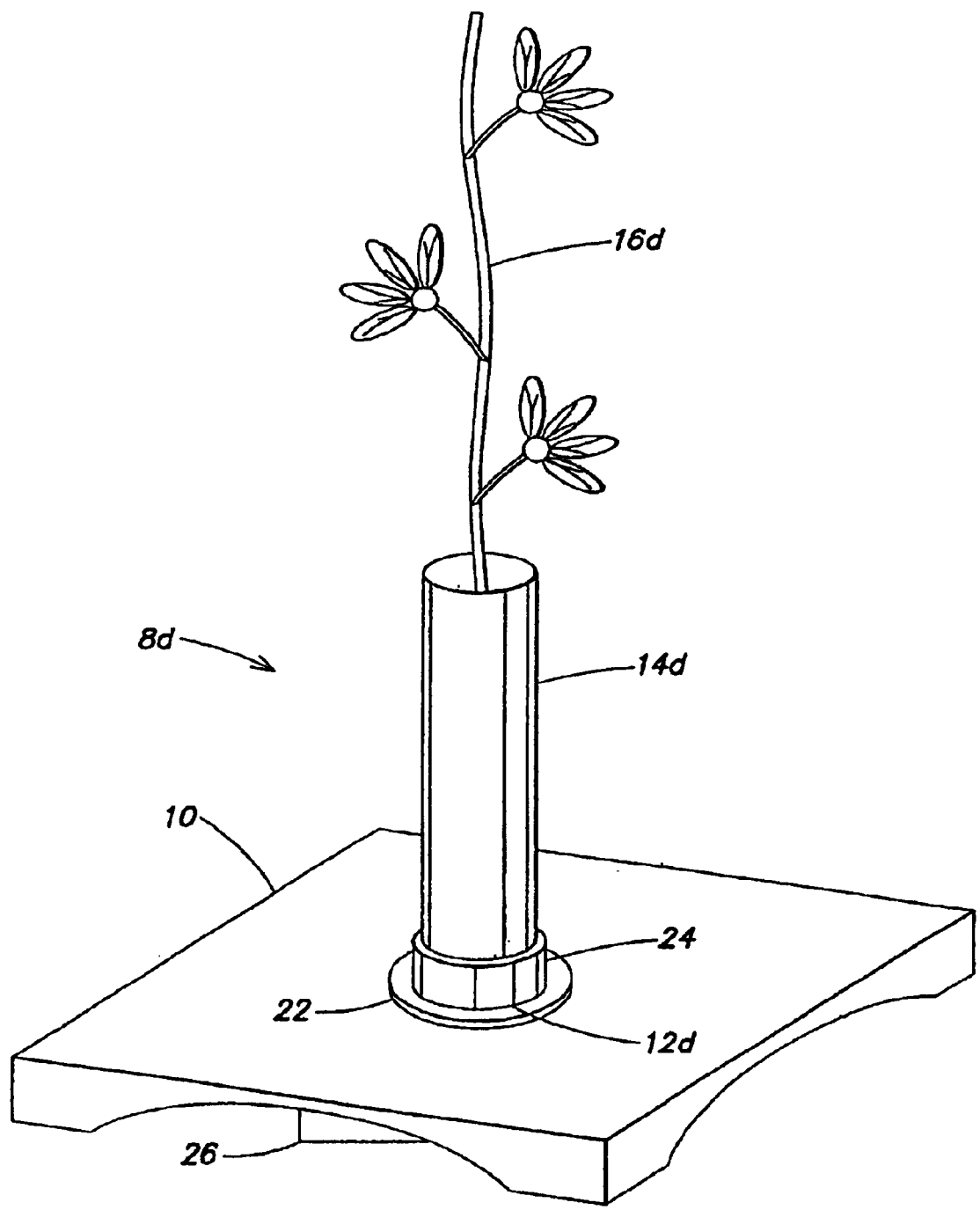

In another embodiment, and as seen in FIGS. 3 and 4, the support (14c,d) is attached to the base (10c,d, respectively) by magnetic means. In the depicted embodiments, the support (14c,d) is attached to an interface (12c,d) that has magnetic properties. These magnetic properties allow the interface (12c,d) to magnetically couple with a base (10c,d) that also has magnetic properties.

In FIG. 3, the base (10c) is a stand or pedestal wherein a portion (20) of the base has magnetic properties. These magnetic properties of the base (10c) enable a magnetic coupling between the interface (12c) and the portion (20) of the base. It should be appreciated, that the base may be any object, as described above with reference to FIGS. 1 and 2, provided, in this example, it has magnetic coupling capabilities.

In FIG. 3, the base (10c) itself has magnetic properties; hence, the base (10c) is not required to be further adapted to have magnetic properties. In FIG. 4, the base (10d) does not have magnetic properties; therefore, a magnet (26) is attached to the base (10d). It should be noted that the magnet (26) must be strong enough to magnetically couple with the interface (12d) through the base (10d). One advantage of this embodiment, is that the base (10d) is not permanently altered. In this embodiment, the magnet (26) is removably positioned underneath the stand (10d) such that when the interface (12d) is placed on top of the stand (10d), magnetic forces draw the separate magnet up to the stand (10d) such that the stand (10d) is sandwiched between the interface (12d) and the removable magnet (26).

It should be appreciated that the magnetic properties of the base may include a separate magnet (26) (as shown in FIG. 4) fixedly or removably disposed on, in, or around the base. Alternatively, the magnetic capabilities may be integrally incorporated with the base or may comprise a coating around or on the base. Further, the entire base may be magnetic. The magnet (26), if used, may have any shape and thickness. In one embodiment, the magnetic properties of the base, whether integral with the base or provided by a separate magnet, may be aesthetically pleasing and be visible or out of sight.

Figure 3A:
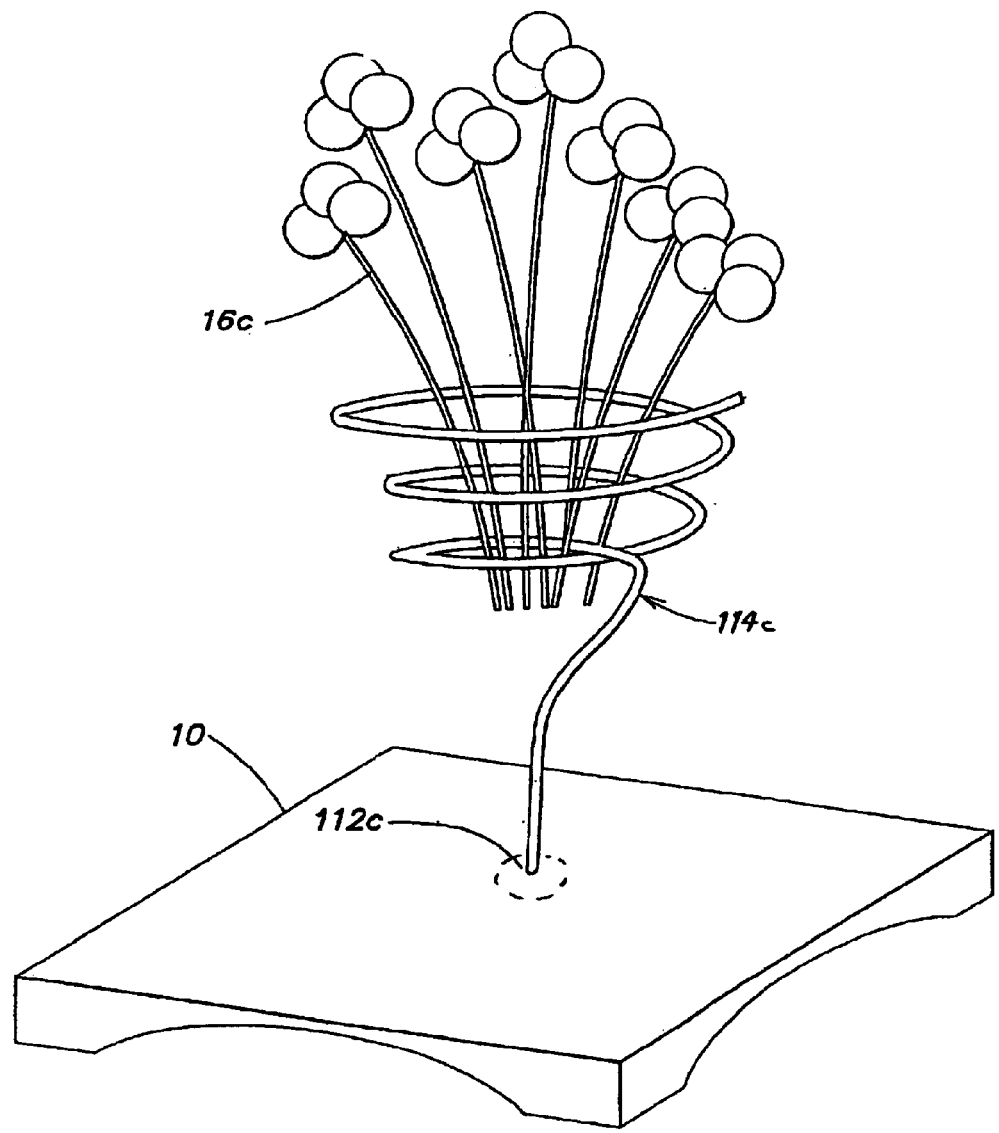

In the specific embodiment of FIG. 3, the support (14c), comprising a reformable wire, is inserted into the interface (12c). It should be appreciated, that the wire may be attached to the interface in any suitable manner, such as wrapping around the interface, welding, interference fitting, clamping, threading, or any other means of securement. Of course, the interface may be inserted into the wire, as the present invention is not limited in this respect. The interface may also be disposed in or around the wire in the form of a coating or dispersed within the wire. For example, the wire (114c) may be formed from a magnetic material; therefore, a portion (112c) of the wire (114c) would comprise the interface, such as can be seen in FIG. 3A.

It should be appreciated that the reformable nature of the wire enables a user to bend the wire into any shape to assist in transportation of the floral, horticultural or culinary item. For example, a user may form an end of the wire into a hook, such that the wire may hang from a rod or a rack, with the item supported by the wire. In another embodiment, a user may initially form the wire with extra length so that the hook may be removed after transport is completed.

Unlike the previous embodiments wherein the support comprises a wire, in FIG. 4, the support comprises a glass bud vase (14d). The bud vase (14d) is inserted into the interface (12d). In this embodiment, the interface (12d) comprises a metallic disk (22) having magnetic properties. A metal cup (24) for holding the bud vase (14d) extends from the interface. It should be appreciated, that the bud vase (14d) need not comprise glass and may be made from plastic, ceramic, metal, or any other material. In addition, the support need not be a bud vase (14d) and may be any type of holder, such as a test tube or watering tube.

It should be further appreciated that the interface (12d) need not include a metal cup (24) into which the support (14d) inserts. Depending upon the shape and orientation of the support, the interface may be shaped and attached in a variety of ways. If the support is a bud vase or holder, the interface may wrap around the support, be fixedly or removably disposed in or around the support or be attached via any other means of attachment.

Figure 5:
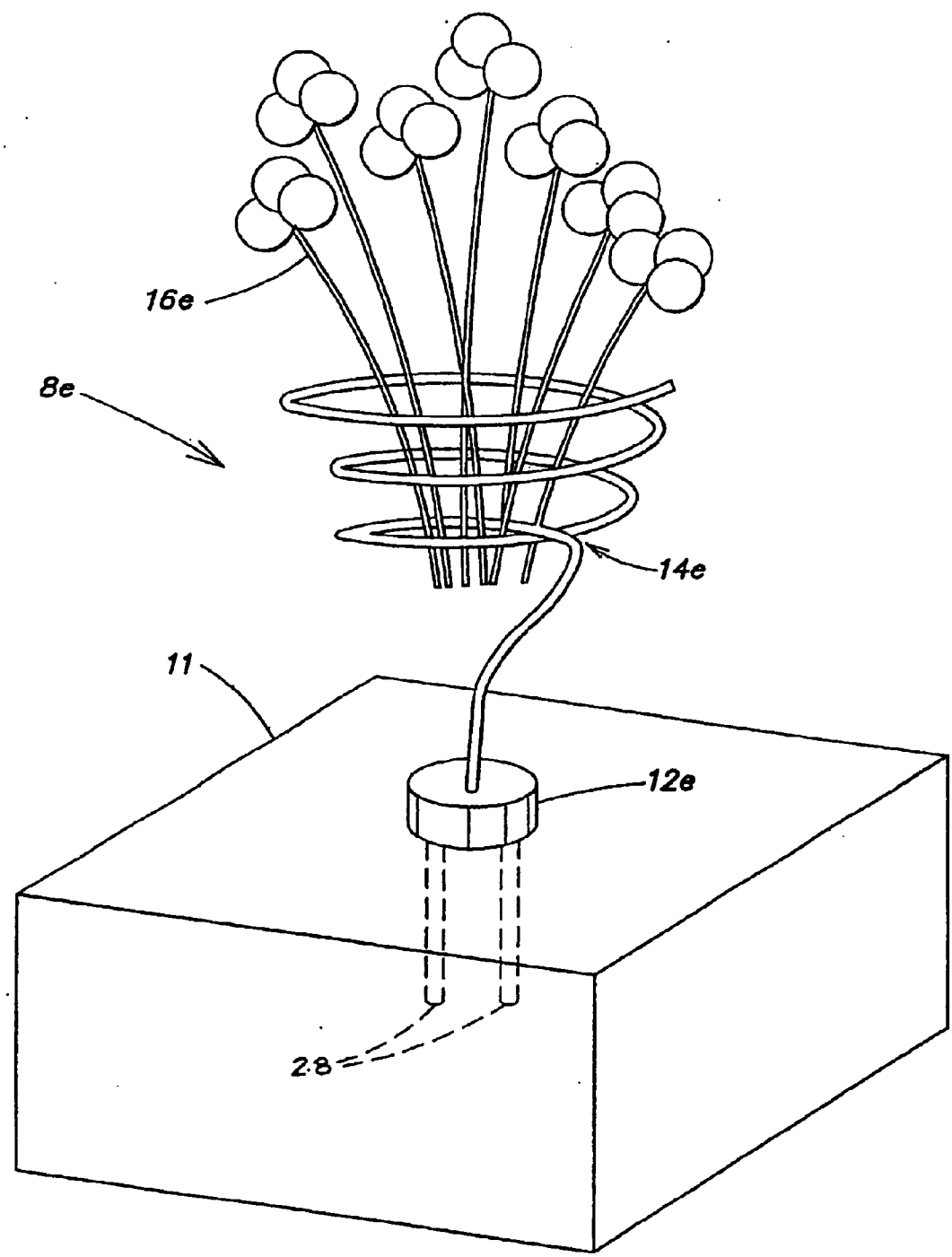

Turning to FIG. 5, the device (8e) is configured to attach to ice (11). In this embodiment, the interface (12e) is made from a heat insulating material. It should be appreciated that the ice block (11) depicted is intended to represent any shape and dimension of ice sculpture, as the invention is not meant to be limiting in this respect. This embodiment enables a support made of a heat conducting material to be connected to the ice without inducing melting. Examples of insulating materials include wood, plastic, rubber, foam, fiberglass or any other material that is thermally insulating. In this embodiment, the interface (12e) comprises a wood cylinder into which the support (14e) is inserted. As in the previous description, the way in which the support is attached to the interface is not intended to be limiting and may include any attachment means, such as, insertion, adhesion, wrapping or magnetic coupling.

To facilitate positioning of the insulating interface (12e) in the ice, the interface (12e) may comprise a pair of pegs (28) attached thereto. The pegs (28) may also be made from an insulating material. In a preferred embodiment, the pegs (28) are cylindrical in shape. In this manner, the ice may be drilled and the pegs inserted into the drilled holes. The pegs (28) may be formed as a non-cylindrical shape, such as rectangular, triangular or other geometrical configurations. Among the advantages of using non-cylindrically-shaped pegs is the ability of the interface to resist rotation in a like-shaped hole. Of course, the use of a pair of pegs also restricts rotation.

In FIG. 5, two cylindrically-shaped wooden pegs (28) are shown extending downwards from the interface (12e). It should be appreciated that any number of pegs (28) may extend from the interface and may extend in any direction.

FIG. 6 depicts a vase (10f), from which a reformable wire (14f) extends. The vase (10f), acting as the base, has a socket (12f) in its side. This socket (12f) acts as the interface and from it, the support (14f) extends. In this embodiment, the support (14) has both aesthetic and mechanical functions. Mechanically, the support, formed as a wire, enables a user to form the wire in any desired shape and to securely hold an arrangement of item(s) (16f) in any desired orientation. Aesthetically, the wire (14f) decorates the vase (10f) and acts as a cohesive element between the item(s) (16f) and the vase (10f) itself. Also, the reformable wire (14f) enables a user to use this vase (10f) with a variety of different arrangements of item(s).

In addition to the reusability and reconfigurability of the wire for different arrangements, various bases, interfaces and supports as described above, may be used interchangeably with one another. This system enables a choice among multiple bases to be used to support a single arrangement of item(s). For example, the wire (14a) containing one arrangement of item(s) (16a) (see FIG. 1), may be removed from the bottle holder (10a) and reinserted into a serving tray (10b) as in FIG. 2.

With respect to the embodiments of FIGS. 3 and 4, the supports (14c,d) may be removed from the interfaces (12c,d) and replaced with another support. For example, if the bud vase (14d) is removably inserted into the metal cup (24) of the interface (12d), the bud vase (14d) can be removed and replaced with a different bud vase (14d) or support containing a different arrangement of items (16).

In addition or alternatively, the interfaces (12c,d) may be removed from the bases (10c,d). For example, in an embodiment where the support is fixedly attached to the interface, the interface itself may be removed and a new interface and support may be attached to the base.

With respect to the ice (11) in FIG. 5, interchangeable supports, interfaces and bases is also contemplated. For example, if the ice begins to melt, the interface (12e), support (14e) and item(s) (16e) may be removed and reinserted into another ice block or sculpture or other base. Additionally or alternatively, the support (14e) and item(s) (16e) may be removed from the interface (12e) and replaced by a different support and item(s) for display.

It should be further appreciated, that one base (10) may accommodate a plurality of interfaces and supports. For example, a serving platter may have two or more arrangements of item(s) in differing areas of the base. The present invention is designed to enable any number of interfaces and supports to be removably attached to any given base.

It should be understood that the foregoing description of the invention is intended merely to be illustrative thereof and that other embodiments, modifications and equivalents are within the scope of the invention recited in the claims appended hereto. Further the support, interface and base systems described above include various features and articles that may be employed singularly or in any suitable combination.

What is claimed is:

1. A decorative display apparatus for displaying at least one of culinary, horticultural and floral items comprising:
   a transportable base having a generally planar mounting surface;
   an interface magnetically coupleable with the base, the interface having a generally planar coupling surface configured to extend in a first direction substantially parallel to the mounting surface of the base; and
   a support directly attached to a top surface of the interface, the support adapted to engage the at least one of culinary, horticultural and floral items, the support comprising an elongate sculpting wire having a first end directly attached to the top surface of the interface, a second free end and an elongate length therebetween, the elongate sculpting wire extending from the interface in a second direction that is substantially perpendicular to the first direction, the wire being adapted to be formed and reformed by a user into any desired shape, the wire being adapted to directly support the at least one of culinary, horticultural and floral items in any desired orientation and at any position on the wire that is elevated and spaced entirely from the base without an additional support component formed on the wire that is configured to aid in supporting the at least one of culinary, horticultural and floral items.

2. The display apparatus according to claim 1, in combination with a plurality of bases, wherein the interface is able to magnetically couple to any one of the plurality of bases.

3. The display apparatus according to claim 1, wherein the base comprises a serving platter.

4. The display apparatus according to claim 1, wherein the base comprises a vase.

5. The display apparatus according to claim 1, wherein the base comprises a bottle holder.

6. The display apparatus according to claim 1, wherein the base comprises an insulating material, such that the base can be inserted into an ice sculpture.

7. The display apparatus according to claim 1, wherein the wire is formed of malleable aluminum.

8. The display apparatus according to claim 1, wherein a portion of the support comprises the interface.

9. The display apparatus according to claim 8, wherein at least one of the first end and a portion of the wire located along the length of the wire is attachable to the base.

10. The display apparatus according to claim 8, wherein a portion of the wire located along the length of the wire comprises the interface, the interface being disposed in the wire.

11. The display apparatus according to claim 8, wherein at least one of the first end and the portion of the wire located along the length of the wire is coated with a magnetic coating.

12. The display apparatus according to claim 1, wherein the base comprises magnetic properties.

13. The display apparatus according to claim 1, wherein a portion of the wire is constructed and arranged to be wrapped around the at least one of culinary, horticultural and floral items.

14. The display apparatus according to claim 1, in combination with the at least one of culinary, horticultural and floral items.

15. The combination according to claim 14, wherein the at least one of culinary, horticultural and floral items comprises a plurality of separate items, with at least one item being held at a position on the wire that is spaced from another item held on the wire.

16. The combination according to claim 14, wherein the wire comprises an unadorned portion where neither the base nor the at least one of culinary, horticultural and floral items is attached.

17. The display apparatus according to claim 1, wherein the interface comprises a magnet that is hidden from sight.

18. The display apparatus according to claim 1, further comprising a second base, wherein the support is adapted to support the second base.

19. The display apparatus according to claim 1, wherein the interface is constructed and arranged to securely hold the wire support, thereby allowing the user to form and reform the wire support.

* * * * *